United States Patent [19]
Rojecki

[11] Patent Number: 4,844,554
[45] Date of Patent: Jul. 4, 1989

[54] EMPTY-LOAD VALVE DEVICE

[75] Inventor: Walter E. Rojecki, Watertown, N.Y.

[73] Assignee: General Signal Corporation, Stamford, Conn.

[21] Appl. No.: 198,965

[22] Filed: May 26, 1988

[51] Int. Cl.$^4$ .............................................. B60T 8/22
[52] U.S. Cl. .................................. 303/22.7; 303/22.2
[58] Field of Search .................... 303/22.6, 22.7, 22.8, 303/27.1, 22.2

[56] References Cited
U.S. PATENT DOCUMENTS
4,045,094  8/1977  Yanagawa et al. ................ 303/22.7

Primary Examiner—Duane A. Reger
Attorney, Agent, or Firm—Robert H. Hubbard

[57] ABSTRACT

An empty-load valve device has a single housing competing coaxially a load sensing push rod, a load sensing piston, a ratio piston, a ratio valve and a spring for retracting the push rod to a normal position. The load sensing push rod actuates the ratio piston to open an equalizing valve to fill an equalizing volume from a control valve and to permit the ratio piston to limit brake cylinder pressure upon sensing an empty car.

23 Claims, 1 Drawing Sheet

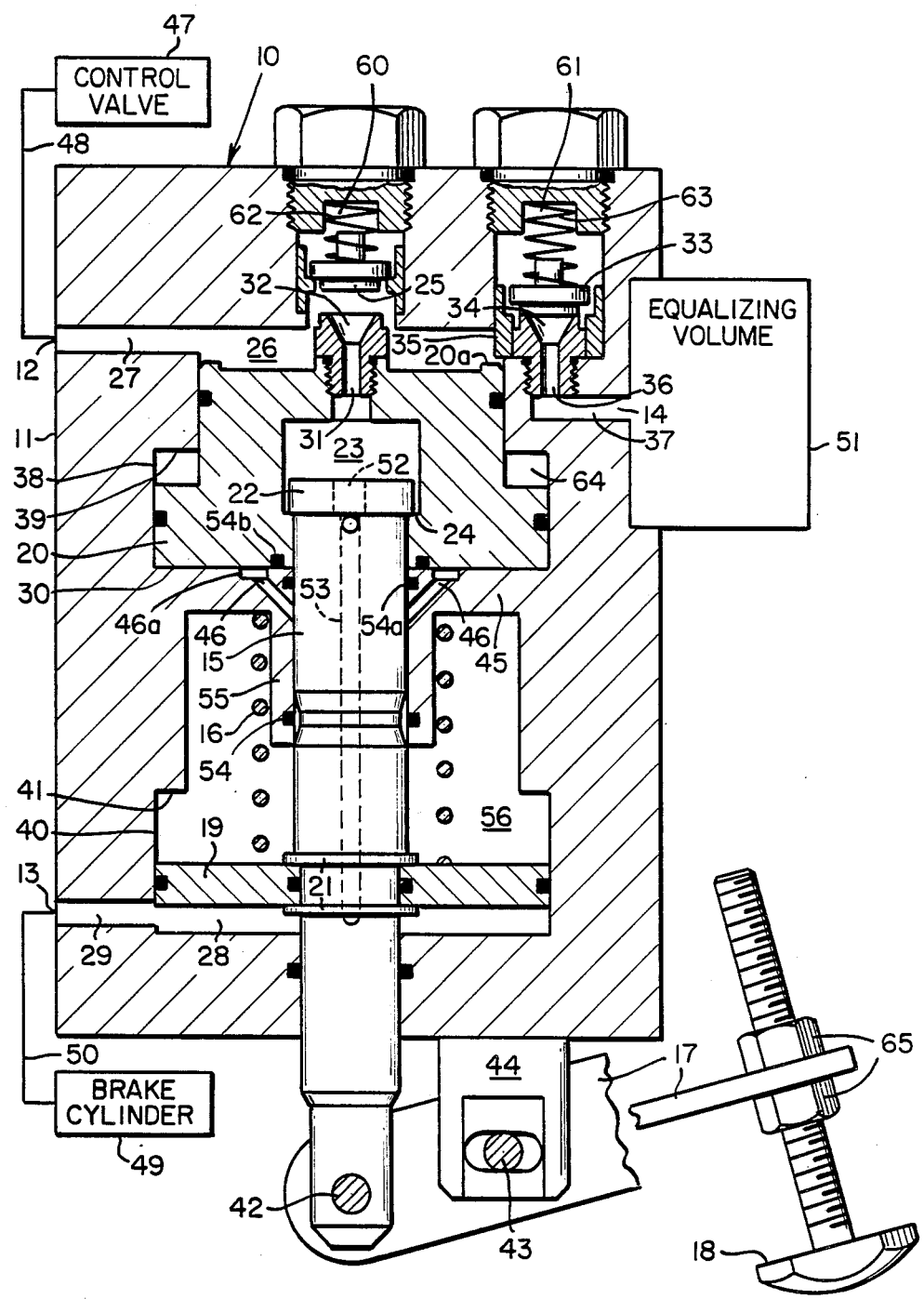

4,844,554

EMPTY-LOAD VALVE DEVICE

BACKGROUND

Empty-load changeover apparatus in current use has a changeover device mounted to a pipe bracket and a separate load-sensing mechanism provided according to a U.S. Scott Pat. No. 3,671,086, granted June 10, 1972, generally known as an SC-1 valve. This apparatus is much too large and heavy to be mounted on a railway truck, for example, as would be required for the braking system disclosed in the U.S. Engle Pat. No. 4,653,812, granted Mar. 31, 1987. This patent discloses a combined empty-load changeover and load sensing device, but is still much too large and heavy for railway truck mounted brake apparatus including a triple valve and reservoirs.

An object of the present invention is to provide improved empty-load changeover apparatus which substantially obviates one or more of the limitations and disadvantages of the described prior systems.

Another object of the present invention is to provide an improved empty-load valve device that is much lighter and more compact than the prior art systems.

Another object of the present invention is to provide an improved empty-load valve device that is simplified and less expensive to manufacture than the above described prior art devices.

SUMMARY

An empty-load valve device has a single housing having brake cylinder, control valve and equalizing volume ports. A spring biased load sensing piston senses, by its axial position whether a car truck is loaded or empty and a ratio piston, by its axial position, selectively operates a ratio valve to limit brake cylinder pressure for empty cars. An empty-load sensing push rod coaxially connects to the sensing piston and the ratio piston but permits the ratio piston to close its ratio valve only when braking is provided for an empty car.

The push rod had an enlarged head that operates in a lost motion chamber in the ratio piston to prevent the ratio piston valve from closing during braking for a loaded car and to permit the ratio valve to be operated by the ratio piston during braking for an empty car.

The ratio piston is raised by the push rod during braking for an empty car to mechanically permit the opening of an equalizing valve for delivering control fluid pressure from the control valve port to an equalizing volume port.

For a better understanding of the present invention, together with other and further objects thereof, reference is had to the following description taken in connection with the accompanying drawing, while its scope will be pointed out in the appending claims.

IN THE DRAWINGS

The accompanying drawing is an elevational view, partly by cross section and partly by schematic illustrations of an empty-load valve device according to a preferred embodiment of the present invention.

With reference to the drawing, an empty-load valve device 10 comprises a housing 11 having control valve, brake cylinder, and equalizing volume ports 12, 13 and 14 respectively. The load sensing piston 19 is normally biased downwardly by a spring 16 to retract a load sensing lever 17 having a load sensing head 18 for contacting a portion of an unloaded structure of a railway car truck (not shown).

The load sensing push rod 15 is coaxial with a load sensing piston 19 and a ratio piston 20, being suitably secured to the load sensing piston 19 as by the snap rings 21 on the opposite sides of the load sensing piston 19. The upper end of push rod 15 has a cap 22 disposed in a lost motion cavity chamber 23 in the ratio piston 20. The cap 22 normally is retracted by the spring 16 against a shoulder 24 of the cavity 23 in the ratio piston 20, which maintains a ratio valve 25 in a normally open position.

The housing 11 has a first pressure chamber 26 at the top of the ratio piston 20 that is connected by a passageway 27 to the control valve port 12. Similarly, a second pressure chamber 28 below the sensing piston 19 is connected by a passageway 29 to the brake cylinder port 13 and a third pressure chamber 30 beneath the ratio piston 20 is connected to the control valve port 12 through a passage around the upper end of push rod 15, and axial passage 31 through the normally open seat 32 of the ratio valve 25, first pressure chamber 26 and passage 27 to the control valve port 12.

An equalizing valve 33 at the right of the ratio piston valve 25 is normally closed against its seat 34. The valve 33 has an axially movable sleeve 35 that is subject to actuation by a point 20a of the ratio piston 20 when the ratio piston 20 is actuated by the push rod 15 in response to the sensing of the force on the associated car truck as being that of an empty car. The equalizing valve seat 34 has an axial passage 36 connecting the valve to equalizing volume port 14 through the passageway 37.

The ratio piston 20 operates in a stepped bore 38 in housing 11, and it is operable axially in a range limited by shoulder 39 of the housing 11.

Similarly there is another stepped bore 40 in the lower portion of housing 11 that limits movement of the sensing piston 19 by a shoulder 41.

The push rod 15 is connected to the sensing lever 17 by a pin 42, the lever 17 being pivoted at 43 in a bracket 44 secured to the housing 11 so as to provide a sensing lever ratio of approximately 10 to 1.

The housing 11 has a transverse divider 45 forming a lower seat for the ratio piston 20, passageway 46 being provided for venting the third pressure chamber 30 at the bottom of the ratio piston 20 to facilitate the seating of the piston 20 as will be hereinafter considered when considering the mode of operation of the valve device 10.

A control valve 47 is indicated as being connected over a passage 48 to the control valve port 12; a brake cylinder 49 is indicated as being connected to the brake cylinder port 13 over a passage 50; and an equalizing of volume 51 is illustrated as being connected to the equalizing port 14.

The invention will now be further described with reference to typical operating conditions.

OPERATION

Normal Conditions

Normal conditions of the empty-load device 10 are illustrated in the drawing wherein there is no fluid pressure applied at any of the ports 12, 13 and 14 and the spring 16 biases the push rod 15, the ratio piston 20 and the sensing piston 19 to their lower positions, wherein the ratio piston 20 is held down against transverse divider 45 by force of the push rod cap 22 on the ratio piston shoulder 24. This same shoulder 24 limits lower movement of sensing piston 19 and retracts the sensing arm 17 away from an unsprung portion of an associated car truck (not shown) to an inactive stow position.

EMPTY CAR BRAKE APPLICATION

Upon initiation of a brake application, control valve 47 delivers fluid pressure at the control valve port 12 causing fluid to flow to the brake cylinder 49 through passage 27, first chamber 26 above the ratio piston 20, open ratio valve 25, axial passage 31 of the ratio valve seat 32, lost motion cavity 23, axial passages 52 and 53 in the push rod 15, second chamber 28 beneath the sensing piston 19 and passage 29 to brake cylinder port 13. This develops pressure in second chamber 28 beneath the sensing piston 19 for opposing the force of spring 16 to move the push rod 15 upwardly and move the sensing head 18 downwardly to an extent limited by movement of the sensing piston 19 against a stop 41 in the stepped bore 40 of the housing 11. This amount of travel permits the push rod 15 to move up against the top of lost motion chamber 23 to mechanically break the seal 54b in the bottom of the ratio piston 20 and permit fluid to enter chamber 30, beneath the piston 20 from chamber 23 and passages 31, 32 and 26 so as to raise the ratio piston 20 and the sleeve 35 of the equalizing valve 33 to cause fluid to flow from the control valve 47 through open valves 25 and 33 to equalizing port 14 and the equalizing volume 51. This mechanical movement of the push rod 15 being limited by shoulder 41 does not close ratio valve 25. This permits the equalizing volume 51 to be charged to full control valve pressure, thus permitting equalization to be accomplished with a minimum volume reservoir.

With control fluid pressure on both upper and lower sides of the ratio piston 20, the smaller diameter of the top portion of the piston 20 causes the ratio piston 20 to move upwardly to close ratio valve 25 when the brake cylinder 49 has been pressurized to substantially 60% of full service or emergency braking pressure for loaded cars.

EMPTY CAR RELEASE

When brake cylinder pressure is released, it is released through the control valve 47, rather than through the empty load valve device 10, in a conventional manner, the first chamber 26 and the equalizing volume 51 are vented through the control valve 47 before the reduction in brake cylinder pressure in the second chamber 28 permits closure of equalizing valve 33.

Ratio valve 25, and equalizing valve 33 have spring chambers 60 and 61 with springs 62 and 63 respectively. When second chamber 28 has been vented through the control valve 47, restoration spring 16 drives sensing piston 19 downwardly to restore both pistons 19 and 20 to their normal positions. When the push rod 15 moves downwardly to the position shown, O ring reseals the ratio piston 20 from the spring chamber 56, and passage 46 vents the third chamber 30 at the lower end of the ratio piston 20 to ensure the bottoming and sealing against O-ring 54b of this piston against the transverse divider 45 to fully open ratio valve 25 and permit closing of equalizing valve 33 to restore the system to its normal conditions as they have been described.

LOADED CAR BRAKE APPLICATION

Upon initiation of a brake application for a loaded car, fluid pressure supplied at control valve port 12 is supplied to brake cylinder port 13 as has been described for an empty car, but the sensing head 18 of lever 17 is only depressed a limited amount before being stopped by an unsprung portion of a car truck thus limited upward movement of push rod 15 within the lost motion chamber 23. The sensing head 18 is adjusted by nuts 65 so that cap 22 on push rod 15 prevents caps 22 from striking the top of chamber 23 by acting on shoulder 24 to prevent ratio piston 20 from closing the ratio valve 25 and opening the equalizing valve 33. Thus a brake cylinder 49 connected to the brake cylinder port 13 can be actuated to apply full service or full emergency braking pressure to wheels of an associated car truck. The release of a loaded car brake application is by venting the brake cylinder 49 through control valve 47 and venting chambers 26, 28, and 30 of empty-load valve device 10 as has been described for an empty car to permit push rod 15 to restore sensing lever 17 to its stow position.

The empty-load valve device 10, according to the present invention, can be used in connection with a triple control valve also mounted on a car truck as disclosed in Engle U.S. Pat. No. 4,653,812, granted Mar. 31, 1987, or in connection with a conventional car body mounted ABD or ABDW valve, for example.

The present invention materially reduces the size, weight and cost of manufacturing an empty-load valve device and makes it readily adaptable for use where space and weight are limited, such as for mounting on a car truck.

Another improvement in the present invention, as compared to the generally known SC-1 valve, is that the equalizing volume 51 is required to be only 60% of the volume of a corresponding equalizing volume of the SC-1 valve because it is connected directly to the control valve 47 and thus maintained at full pressure from the control valve 47 during braking of an empty car, rather than at the reduced 60% pressure of brake cylinder 49.

Having thus described an empty-load valve device as a preferred embodiment of the present invention, it is to be understood that various modifications and alterations may be made to the specific embodiment shown without departing from the spirit or scope of the present invention.

I claim:

1. An empty-load valve device comprising a housing having brake cylinder, control valve and equalizing volume ports respectively, wherein an improved empty-load valve device comprises:
   (a) sensing means having a sensing piston for sensing load force bearing on a railway car truck,
   (b) ratio piston means having a ratio piston for limiting fluid pressure in a brake cylinder,
   (c) the sensing means having a push rod extending coaxially into the sensing piston and the ratio piston operable longitudinally to operate both sensing and ratio pistons and to selectively control fluid pressure at the brake cylinder port in accordance with load on the railway car truck and
   (d) the push rod having a coaxial passageway connecting a first chamber at one end of the ratio piston to a second chamber at the opposite end of the sensing piston.

2. An empty-load valve device according to claim 1 wherein the sensing means includes a sensing arm adapted to actuate the push rod axially in accordance with load forces on the car truck.

3. An empty-load valve device according to claim 1 wherein the ratio piston means operates a ratio valve for selectively controlling pressure at the brake cylinder port in accordance with load on the car truck.

4. An empty-load valve device according to claim 3 wherein the ratio valve is of the poppet type having a seat extending coaxially from one end of the ratio piston.

5. An empty-load valve device according to claim 1 wherein the sensing piston and the ratio piston are coaxially disposed in a stepped bore in the housing.

6. An empty-load valve device according to claim 5 wherein the housing journals the push rod.

7. An empty-load valve device according to claim 5 wherein the housing contains an equalizing valve of the poppet type disposed to be selectively opened and closed by axial movement of the ratio piston.

8. An empty-load valve device according to claim 7 wherein opening of the equalizing valve connects the control valve port of the equalizing volume port.

9. An empty-load valve device according to claim 1 wherein passageways are provided in the housing for connecting the control valve port to the brake cylinder port through a ratio valve.

10. An empty-load valve device according to claim 9 wherein the control valve port is connected through the first chamber at one end of the ratio piston and through a coaxial passage of the ratio valve to a third chamber at the opposite end of the ratio piston.

11. An empty-load valve device according to claim 1 wherein the push rod has limited axial lost motion within a central opening in the ratio piston without actuating the ratio piston when the push rod is axially positioned for governing braking pressure of a heavy car.

12. An empty-load valve device according to claim 11 wherein the push rod axially operates the ratio piston to open an equalizing valve when axially positioned for an empty car to open a passage connecting the control valve port to the equalizing volume port.

13. An empty-load valve device according to claim 12 wherein the equalizing valve has a sleeve disposed to be actuated by movement of the ratio piston to open the equalizing valve upon sensing an empty car.

14. An empty-load valve device according to claim 5 wherein the housing has a transverse divider having the third chamber on one side thereof and a spring chamber on the other side thereof, a spring in the spring chamber for biasing the sensing piston and the push rod axially to a normal position when there is no fluid pressure at the control valve port.

15. An empty-load valve device according to claim 14 wherein the push rod is secured to the sensing piston for actuating the push rod when fluid pressure is applied from the control valve port to a chamber adjoining the sensing piston.

16. An empty-load valve device comprising a housing having brake cylinder, control valve and equalizing volume ports respectively wherein an improved empty-load valve device comprises:

(a) a housing having upper and lower coaxial stepped bores seperated by a transverse divider,
(b) a ratio piston axially operable in the upper stepped bore having a ratio valve for selectively governing a degree of braking in accordance with whether a car is empty or loaded.
(c) load sensing means having a load lever pivotally secured to the housing for sensing load on springs of a car truck,
(d) the load sensing means having a spring biased load sensing piston in the lower stepped bore of the housing, and
(e) a push rod pivotally secured at one end to the load lever and operably connected to the load sensing piston and the ratio piston for controlling fluid pressure applied at the brake cylinder and equalizing volume ports in accordance with fluid pressure applied at the control valve port as selectively modified in accordance with the condition of the load sensing means.

17. An empty-load device according to claim 16 wherein the ratio piston has a coaxial ratio valve seat secured to one end thereof for limiting pressure build up at the brake cylinder port upon the sensing means sensing an empty car.

18. An empty-load valve device according to claim 16 wherein an equalizing valve governs connection of the control valve port to the equalizing valve port and the equalizing valve is mechanically opened by upward movement of the push rod responsive to the sensing means being positioned for an empty car.

19. An empty-load valve device according to claim 18 wherein upward movement the push rod mechanically operates the ratio piston upwardly upon sensing an empty car and the ratio piston mechanically opens the equalizing valve.

20. An empty-load valve device according to claim 17 wherein the upper end of the push rod has a cap extending into a coaxial lost motion chamber in the ratio piston for preventing the closing of the ratio valve upon sensing a loaded car.

21. An empty-load valve device according to claim 20 wherein the cap on the push rod has a shoulder acting against a shoulder of the lost motion chamber to prevent the closing of the ratio valve upon sensing a loaded car.

22. An empty-load valve device according to claim 20 wherein the lost motion chamber permits axial movement of the push rod to a limited extend upon sensing a loaded car without causing the upward movement of the ratio piston.

23. An empty-load valve device according to claim 10 wherein the control valve port is connected to the third chamber through a seal at the bottom of the ratio piston that is broken by the push rod lifting the ratio piston off of its seat upon sensing that a car is empty.

* * * * *